US011458524B2

(12) United States Patent
Del Fabro (10) Patent No.: US 11,458,524 B2
(45) Date of Patent: Oct. 4, 2022

(54) APPARATUS AND METHOD TO SUPPLY BARS

(71) Applicant: M.E.P. Macchine Elettroniche Piegatrici S.P.A., Reana del Rojale (IT)

(72) Inventor: Giorgio Del Fabro, Udine (IT)

(73) Assignee: M.E.P.—MACCHINE ELETTRONICHE PIEGATRICI S.P.A., Reana del Rojale (IT)

( * ) Notice: Subject to any disclaimer, the term of this patent is extended or adjusted under 35 U.S.C. 154(b) by 297 days.

(21) Appl. No.: 16/956,535

(22) PCT Filed: Dec. 21, 2018

(86) PCT No.: PCT/IT2018/050258
§ 371 (c)(1),
(2) Date: Jun. 19, 2020

(87) PCT Pub. No.: WO2019/123506
PCT Pub. Date: Jun. 27, 2019

(65) Prior Publication Data
US 2021/0138525 A1 May 13, 2021

(30) Foreign Application Priority Data
Dec. 22, 2017 (IT) .................. 102017000149383

(51) Int. Cl.
*B21D 43/00* (2006.01)
*B21D 43/12* (2006.01)
(Continued)

(52) U.S. Cl.
CPC .......... *B21D 43/006* (2013.01); *B21D 43/12* (2013.01); *B65G 1/0442* (2013.01); *B65G 47/34* (2013.01);
(Continued)

(58) Field of Classification Search
CPC ...... B21D 43/006; B21D 43/12; B21D 43/14; B65G 1/0442; B65G 47/34;
(Continued)

(56) References Cited

U.S. PATENT DOCUMENTS 2,992,802 A * 7/1961 Spillios ................ B65G 1/0442
211/60.1
3,655,073 A * 4/1972 Andersson ........... B65G 1/0442
414/281
(Continued)

FOREIGN PATENT DOCUMENTS

DE 229974 A1 11/1985
EP 3159072 A1 4/2017
(Continued)

OTHER PUBLICATIONS

Int'l Search Report and Written Opinion dated Apr. 11, 2019 in Int'l Application No. PCT/IT2018/050258.

*Primary Examiner* — Mark A Deuble
(74) *Attorney, Agent, or Firm* — Panitch Schwarze Belisario & Nadel LLP (57) ABSTRACT

Apparatus to supply bars which includes a work plane on which to position a bundle of said bars and a removal device configured to remove at least one bar from said work plane in order to transfer it to a destination station. The supply apparatus includes a plurality of containing units each configured to house a respective bundle of a determinate type of bar.

10 Claims, 7 Drawing Sheets

(51) Int. Cl.
*B65G 47/34* (2006.01)
*B65G 47/51* (2006.01)
*B65G 1/04* (2006.01)
*B65G 47/90* (2006.01)
*B65G 47/53* (2006.01)
*B65G 15/20* (2006.01)
*B65G 47/08* (2006.01)

(52) U.S. Cl.
CPC .......... *B65G 47/5113* (2013.01); *B65G 47/53* (2013.01); *B65G 47/907* (2013.01); *B65G 15/20* (2013.01); *B65G 47/08* (2013.01); *B65G 2201/0217* (2013.01)

(58) Field of Classification Search
CPC .. B65G 47/5113; B65G 47/53; B65G 47/907; B65G 15/20; B65G 47/08; B65G 2201/0217
See application file for complete search history.

(56) References Cited

U.S. PATENT DOCUMENTS

| | | | | |
|---|---|---|---|---|
| 4,732,066 | A * | 3/1988 | Del Fabro | B21D 43/285 198/456 |
| 7,762,759 | B2 * | 7/2010 | Del Fabro | B65G 47/1407 414/745.9 |
| 8,333,135 | B2 * | 12/2012 | Del Fabro | B21F 23/005 82/127 |
| 2003/0201149 | A1 * | 10/2003 | Miglioranza | B21F 23/007 198/369.1 |
| 2008/0131256 | A1 * | 6/2008 | Veit | B65G 47/907 414/730 |
| 2021/0402458 | A1 * | 12/2021 | Del Fabro | B65G 47/08 |

FOREIGN PATENT DOCUMENTS

| | | |
|---|---|---|
| WO | 2009/109846 A1 | 9/2009 |
| WO | 2014/045242 A1 | 3/2014 |

\* cited by examiner fig. 2 fig. 3 fig. 4 fig. 5 fig. 6 fig. 7 fig. 8 fig. 9 fig. 10 fig. 11 fig. 12 fig. 13 fig. 14 fig. 15 fig. 16

APPARATUS AND METHOD TO SUPPLY BARS

CROSS-REFERENCE TO RELATED APPLICATIONS

This application is a Section 371 of International Application No. PCT/IT2018/050258, filed Dec. 21, 2018, which was published in the English language on Jun. 27, 2019, under International Publication No. WO 2019/123506 A1, which claims priority under 35 U.S.C. § 119(b) to Italian Application No. 102017000149383, filed Dec. 22, 2017, the disclosures of each of which are incorporated herein by reference.

FIELD OF THE INVENTION

The present invention concerns an apparatus and a method to supply bars, for example, for the at least temporary storage of the bars and possible subsequent delivery to a machine downstream.

By the term bars here, we mean in general oblong shaped products such as, for example, rod, reinforcement rods, bars, round pieces, square pieces, or suchlike.

In particular, the bars can be metal, and can be used, for example, in the construction field.

BACKGROUND OF THE INVENTION

It is known to feed bars to user machines, such as bending, stirrup-making, welding, cutting plants, counting machines or other machines.

In particular, it is known to remove the bars by means of bridge cranes or suchlike from suitable stores and supply them to a feed station which feeds them to a final user machine.

Depending on the final product to be obtained, the bars to be supplied to the final user machine can also be of different types, for example bars of different diameter, material, shape, surface working or other.

Normally, each type of bar is supplied in bundles, so that a first bundle can be formed by bars of a first type, a second bundle can be formed by bars of a second type, and so on.

On each occasion, each bundle of bars is removed with a bridge crane from the corresponding store in which it is located and delivered to the feed station. The feed station can be provided with a support plane on which the bundle is disposed. The support plane allows the bars to be dispersed between them and to be subsequently removed and fed to the final user machine.

Once a determinate range of products has been completed, the bars remaining and scattered, for example, on the support plane are again recomposed, and tied to form a new bundle of residual bars. This new bundle is again removed by the bridge crane and returned to the store.

With the bridge crane another bundle of bars is removed, for example of different types, it is transferred to the feed station and therefore the cycle starts again as before.

The method to transfer the bars from the store to the work surface, and vice versa, is therefore extremely complex since it requires to use dedicated structures, the presence of operators to suitably guide and position the movement of the bars, on each occasion, from the store to the work surface.

Moreover, these operations to replace the type of bars can also be very time consuming and also determine possible downtimes of any user machines located downstream of the supply apparatus considered.

Moreover, downstream of the feed station, a station for cutting the bars can be provided, to cut them to size, according to the requirements of the final user machine.

Cutting the bars means obtaining remaining segments of bars, which are often not discharged and stored in an optimal, efficient and automated way, also for possible subsequent re-use.

In general, however, in known apparatuses for supplying bars, even the segments of bars cut to size are not collected or stored in an optimized and efficient manner, for their possible subsequent re-use.

Other limitations and disadvantages of conventional solutions and technologies will be clear to a person of skill after reading the remaining part of the present description with reference to the drawings and the description of the embodiments that follow, although it is clear that the description of the state of the art connected to the present description must not be considered an admission that what is described here is already known from the state of the prior art.

There is therefore a need to provide an apparatus and a method to supply bars, in particular metal bars, which can overcome at least one of the disadvantages of the state of the art.

One purpose of the present invention is therefore to provide an apparatus to supply bars which simplifies and reduces the time required to replace the type of bars to be supplied to the final user machine.

Another purpose of the present invention is to provide a supply apparatus with which bars of different types can be suitably stored in correspondence with the feed station, to be then disposed directly on the feed station, therefore without requiring the use of bridge cranes, removal devices, or other means able to remove, on each occasion and according to requirements, bars of different types from one or more stores for storing the bars.

Another purpose of the present invention is to provide an apparatus to supply bars in which a store containing a plurality of bars of different types can be associated directly at least with the feed station of the apparatus.

It is therefore a purpose of the present invention to provide an apparatus to supply bars which allows the bars to be provided to user machines downstream, avoiding, for example, machine downtimes to allow operations to change the format of the bars.

Another purpose of the present invention is to provide an apparatus to supply bars by means of which the segments of bars cut to size and of different types can be disposed in a corresponding store associated directly with an optimized discharge station.

Another purpose of the present invention is to perfect an effective and automated method to supply bars, in particular metal bars of different types.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purpose, an apparatus to supply bars according to the present invention comprises a work plane on which to position a bundle of bars and a removal device configured to remove at least one bar from the work plane in order to transfer it to a destination station.

In accordance with one aspect of the present invention, the apparatus comprises a plurality of containing units positioned, at least during their condition of use, above the work plane and each configured to house a respective bundle of a determinate type of bar.

The supply apparatus also comprises a plurality of movement means each associated with a respective containing unit in order to take the latter into a first position in which one bundle of bars is delivered to or removed from the work plane, and into at least a second position in which the containing unit is located completely above the work plane. In the second position, the work units do not interfere with the movements of the work plane itself.

In accordance with a possible embodiment, the containing units can be vertically mobile from the first position to the second position, and vice versa, along guides associated with the support frame.

Alternatively, the containing units can be rotatable, in order to assume at least the first and second position.

The present invention also concerns a method to supply bars, comprising positioning a bundle of bars on a work plane and removing at least one bar from the work plane with a removal device, in order to transfer it to a destination station.

In accordance with formulations of the method, it is provided to position respective bundles of different types of bars in a plurality of containing units and, at least during a condition of use, to keep the containing units above the work plane. Each containing unit is associated with respective movement means to take the containing unit into a first position in which one bundle of bars is delivered to or removed from the work plane and into at least a second position in which the containing unit is located completely above the work plane.

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

We will now refer in detail to the various embodiments of the present invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Figure 1:
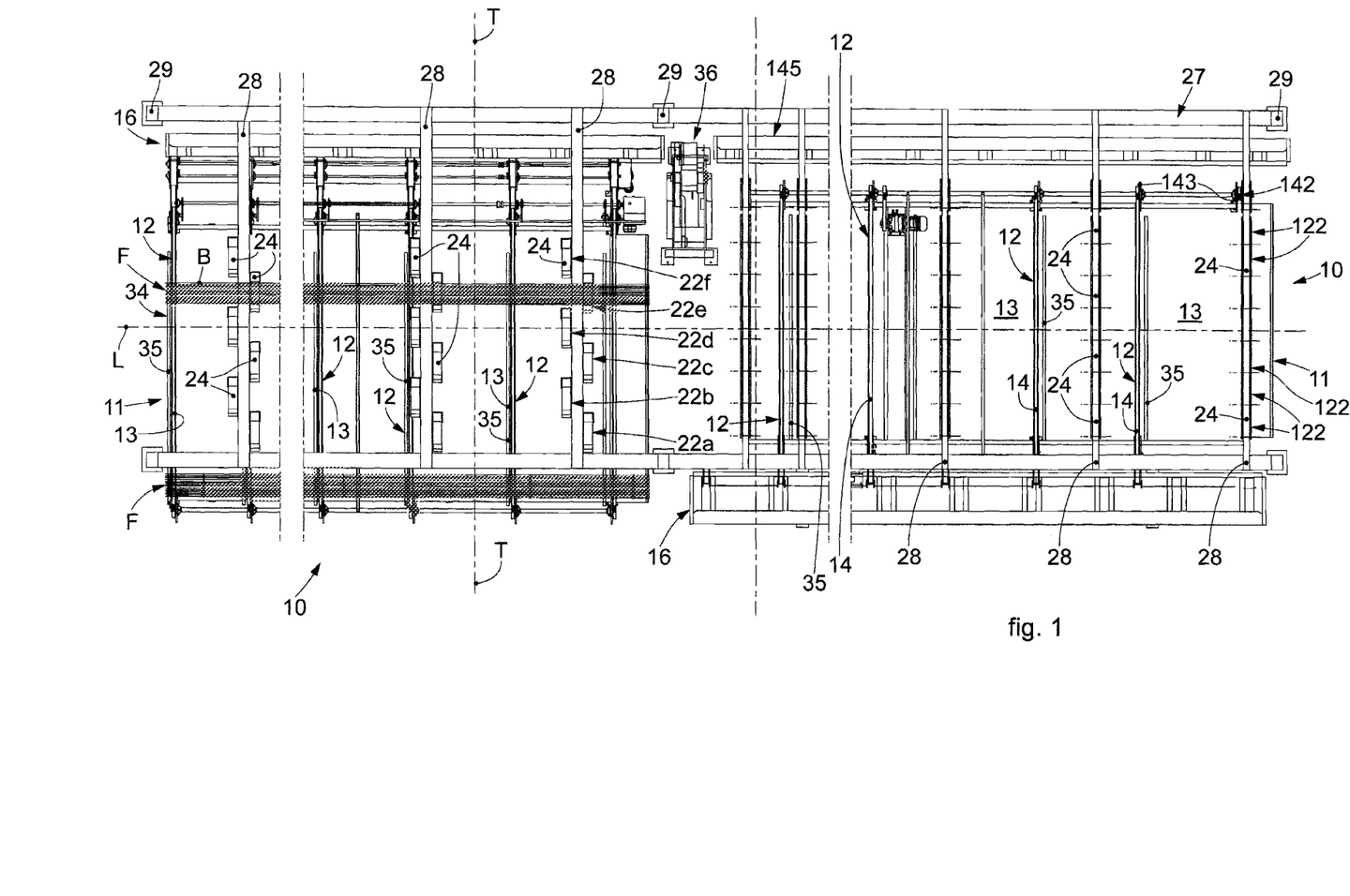
FIG. 1 is a plan view of an apparatus to supply bars according to the invention.

With reference to the attached drawings, see FIG. 1 for example, an apparatus to supply bars B, according to the present invention, is indicated in its entirety by the reference number 10.

In particular, FIG. 1 shows two supply apparatuses 10 cooperating with each other as will be described below.

The supply apparatus 10 comprises at least one work plane 11 configured to support at least one bundle F of bars B.

The work plane 11 develops in a longitudinal direction L and the bars B are put on the work plane 11 with their extension in length parallel to the longitudinal direction L.

The work plane 11 has a width which is determined in a transverse direction T, transverse to the longitudinal direction L, and which defines the loading capacity for the bars B.

The bars B are put on the work plane 11 with their longitudinal development which is transverse to the transverse direction T.

According to some solutions of the invention, the work plane 11 comprises a plurality of support devices 12 to support the bars B. The support devices 12 are distanced from each other by interspaces 13. The interspaces 13 can have sizes comprised between 20 cm and 1.5 m, or more.

Each support device 12 can have an elongated conformation in the transverse direction T and can define the width of the work plane 11.

The support devices 12 can be facing each other and distanced so as to define, between them, the interspaces 13.

The reciprocal disposition of the support devices 12 is such as to ensure the action to support the bars B.

The support plane for the bars B can be defined by the upper surfaces of each of the support devices 12.

According to some solutions of the invention (FIG. 2), each support device 12 can comprise a movement device 14 configured to move the bars B on the work plane 11 in a direction parallel to the transverse direction T.

Figure 2:
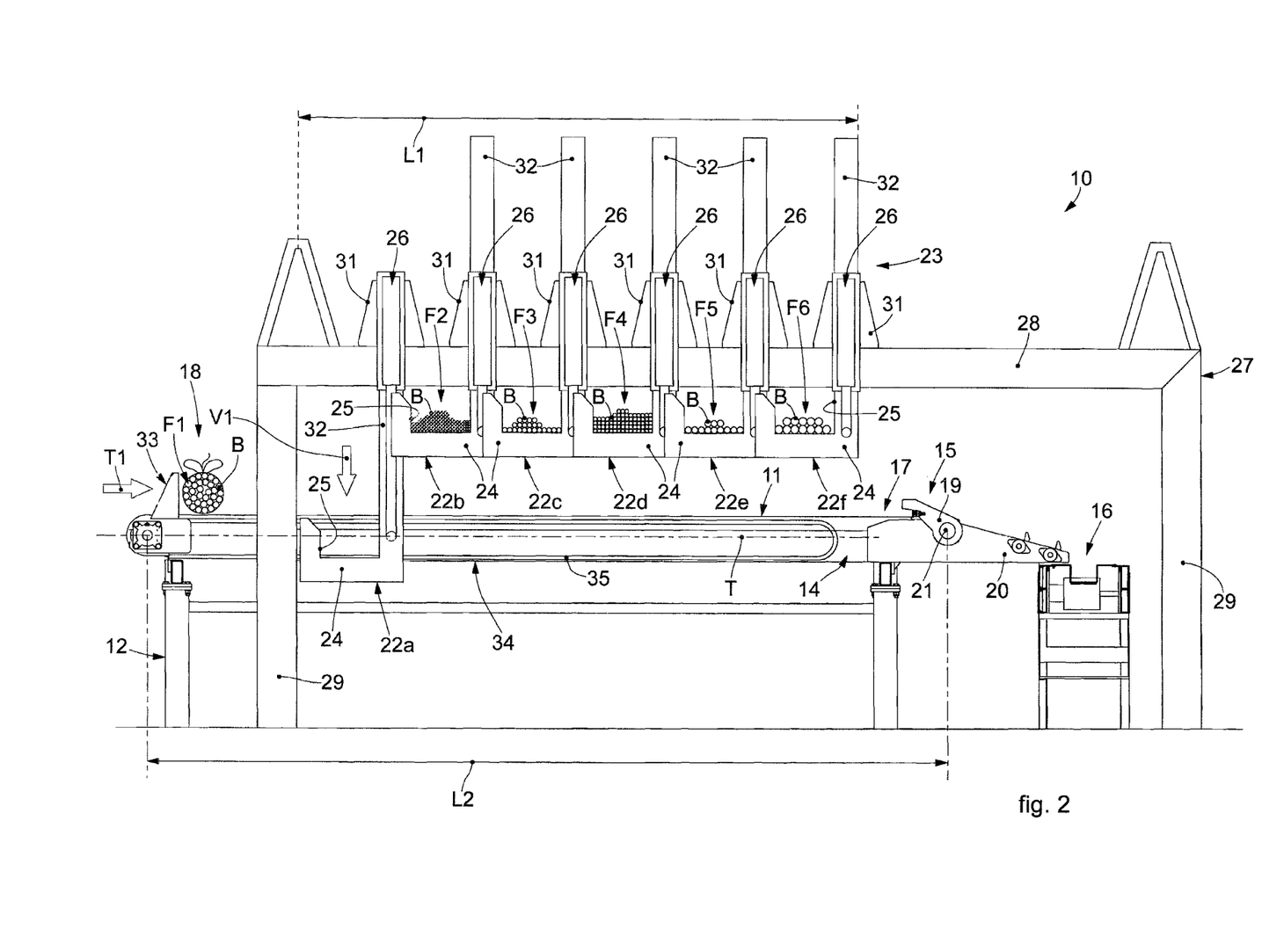
FIGS. 2 to 10 are lateral views of some operating steps of a feed station of the present apparatus to supply bars.

In particular, the movement devices 14 can comprise closed-ring transmission members, such as chains, belts, cables or suchlike, associated with corresponding drive means.

The suitable drive of the movement devices 14 allows to distribute the bars B uniformly on the work plane 11, preventing reciprocal overlapping or twisting thereof.

According to another aspect of the present invention, the supply apparatus 10 comprises a removal device 15 configured to remove from the work plane 11 at least one bar B at a time to transfer it to a destination station 16 located downstream.

The destination station 16 can comprise, for example, a roller way to transport/discharge the bars B toward one or more user machines located downstream.

By way of example only, it is possible to provide that the work plane 11 is provided with a discharge zone 17 in which the removal device 15 is located to discharge the bars B toward the destination station 16.

According to possible solutions, the discharge zone 17 is located in correspondence with a first lateral edge of the work plane 11.

According to possible solutions, the work plane 11 can also be provided with a loading zone 18 in which the bundles of bars F are loaded so as to carry out the operations described below (FIG. 2).

The loading zone 18 can be opposite the discharge zone 17, and positioned, for example, in correspondence with a second lateral edge of the work plane 11, opposite the first lateral edge.

In some embodiments, the movement devices 14 extend in a transverse direction T over the entire width of the feed station 11, from the loading zone 18 to the discharge zone 17.

The removal device 15 can comprise at least one holding element, for example of a magnetic type, or a gripper or suchlike, to take and hold the at least one bar B during its transfer to the destination station 16.

According to possible solutions, the removal device 15 can comprise a plurality of arms 19 on which the holding elements are installed. The arms 19 are mobile in the discharge zone 17 to remove the bars B, with the holding elements, from the work plane 11 and deliver them to the destination station 16.

The work plane 11 can be provided with an inclined plane 20, to discharge the bars B delivered by the holding elements, to the destination station 16.

In some embodiments, a plurality of inclined planes 20 can be provided, each of which is installed on a respective movement device 14.

The arms 16 can be rotated around a rotation shaft 21, by means of suitable drive means. The rotation shaft 21 can be located in correspondence with the first lateral edge of the work plane 11.

According to another aspect of the invention, the supply apparatus 10 can comprise a plurality of containing units 22a, 22b, 22c, 22d, 22e and 22f each of which is configured to receive a respective bundle F1, F2, F3, F4, F5, F6 of bars B.

The containing units 22a-22f can define, as a whole, a store 23 of bars B.

Each bundle F1-F6 can be defined by a different type of bars B. By different type we mean at least one different geometry of the cross section of the bars B, a different size of the bars B, a different material that the bars B are made of, a different origin of the bars B, a different heat treatment of the bars B, etc.

According to another aspect of the present invention, the containing units 22a-22f are positioned, at least in their condition of use, above the work plane 11. This position allows to contain the overall sizes of the plant and, at the same time, allows to make the bundles F1-F6 of bars available to the work plane 11.

According to some embodiments of the invention, the containing units 22a-22f can be located adjacent to each other in a direction parallel to the transverse direction T. This allows to compact the sizes in width of the supply apparatus 10.

In accordance with a possible solution (FIGS. 2-10), the store 23 has a width L1 which is less than the width L2 of the work plane 11. This allows all the containing units 22a-22f located above the work plane 11 to cooperate with the latter for the delivery or removal of the bars B located on the work plane 11, without requiring them to be moved in a direction parallel to the work plane 11.

Embodiments of the present invention can provide that the containing units 22a-22f are supported by, or installed on, a support structure 27.

The support structure 27 is provided with a plurality of support beams 28 positioned above the work plane 11 and on which the containing units 22a-22f are installed.

The support beams 28 can be reciprocally distanced in the longitudinal direction L.

The support beams 28 can be supported, at at least one end, in this case both ends, by support uprights 29.

Each containing unit 22a-22f comprises a plurality of containing elements 24 aligned with each other in a longitudinal direction L and each defining a support seating 25 configured to support part of the bundle F1-F6 of bars B. The bundles F1-F6 of bars B contained in each containing unit 22a-22f are usually in an untied form, and therefore the bars B are free from each other.

Each support seating 25 can have a substantially U-shaped conformation with an aperture which, during use, faces upward to allow the introduction and discharge of the bars B.

According to another aspect of the present invention, the supply apparatus 10 comprises a plurality of movement means 26 each associated with a respective containing unit 22a-22f to take the latter into a first position in which a bundle F1-F6 of bars B is delivered to, or removed from, the work plane 11 and into at least a second position in which the containing unit 22a-22f is located completely above the work plane 11, in a condition where the bundles F1-F6 are temporarily stored and do not interfere with the work plane 11.

In accordance with the embodiments shown in FIGS. 2-10, the movement means 26 are configured to move the containing units 22a-22f linearly, in a direction incident to the work plane 11, and to take the containing units 22a-22f into the first and second positions.

According to some solutions of the invention, the movement means 26 comprise a plurality of linear actuators 30 connected to the containing elements 24 to take them into the first and second positions.

In accordance with possible solutions, linear guide members 31 are associated with each containing unit 22a-22f, having guide axes oriented incident to the work plane 11, and provided to guide the movement of the containing unit 22a-22f from the first to the second position and vice versa.

The guide members 31 are installed on the support structure 27.

In accordance with the embodiment shown in FIGS. 2-10, each containing element 24 is provided with a support rod 32 installed slidable in the guide members 31. When the respective containing unit 22a-22f is positioned in the first position, the support rod 32 is positioned between the interspaces 18, in a condition incident to, and at least partly contained in, the work plane 11.

The support rod 32, moreover, in the first position of the containing unit 22a-22f, is positioned in the thickness of the work plane 11 and positions the respective support seating 25 of the containing element 24 under the work plane 11.

According to possible embodiments of the invention, a thruster 33 can be associated with the work plane 11; the thruster 33 is mobile in a direction parallel to the transverse direction T and, in at least one of its conditions of use, protrudes from the work plane 11 to thrust the bars B on the work plane 11.

The thruster 33 can be associated, or connected, with a movement device 34, which allows to move the thruster 33 in the transverse direction T.

The movement device 34 can comprise one or more transmission members 35, such as chains, belts, cables or suchlike, which are wound in a closed ring.

By means of the movement device 34, the thruster 33 can be translated two-directionally and in a transverse direction T on the work plane 11.

With reference to FIGS. 2-10 we will now show a possible functioning mode of the apparatus 10 according to the invention.

FIG. 2 shows a condition in which a bundle, in this case the first bundle F1 of bars B, for example still tied, is loaded onto the work plane 11 in correspondence with the loading zone 18.

The loading of the bundle F1 can be carried out with bridge cranes, cranes, or other movement apparatuses.

According to possible solutions of the invention, it can be advantageous to provide that the zone above the loading zone 18 is free, that is, not affected for example by the store 23 or by the support structure 27. This allows the loading operations of the bundles of bars B from above.

The bundle F1 of bars B positioned on the work plane 11 is untied.

The containing unit 22a is moved, in the direction indicated by the arrow V1, into the first position to receive the untied bundle F1.

In this condition, therefore, the support seatings 25 of the containing unit 22a are located under the work plane 11 with their aperture open and facing upward, see FIG. 2.

In this position, the containing elements 24 are located in the interspaces 13 between the support devices 12.

Figure 3:
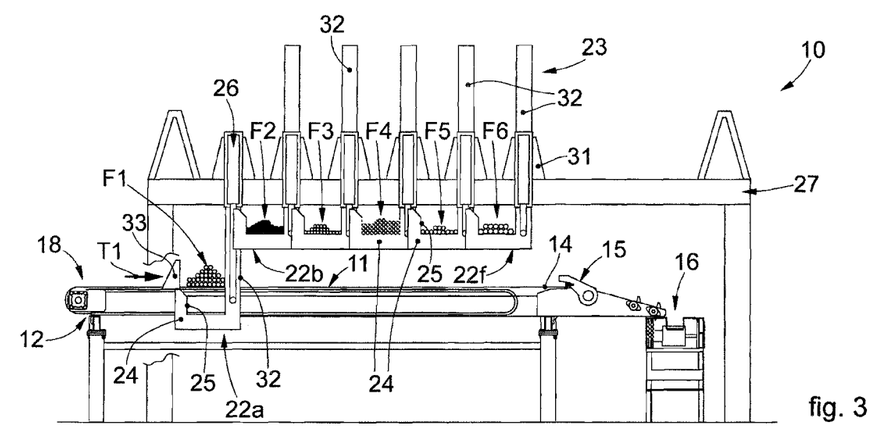

The bars of the bundle F1 can be moved, in the direction indicated by the arrow T1, toward the containing unit 22a by the action of the movement devices 14 of the work plane and/or of the thruster 33 as shown in FIG. 3.

When the bars B reach the containing unit 22a, the support rods 32 define respective abutment walls against the advance of the bars B, which accumulate one above the other and above the support seatings 25.

Subsequently (FIG. 4), the containing unit 22a is lifted in the direction V2 and is disposed in its second position, not interfering with the movement of the work plane 11.

Figure 4:
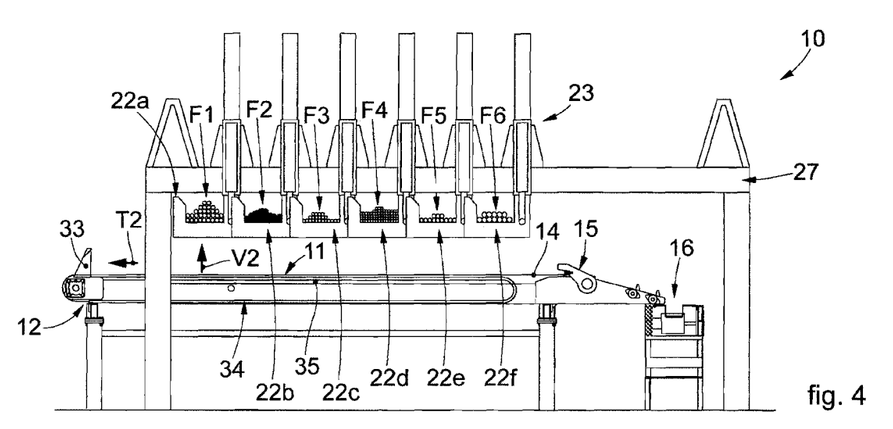

The thruster 33 can be returned to the initial position, by translation in direction T2, see FIG. 4.

For example, it can be hypothesized that the other bundles F2-F6 are loaded into the respective containing units 22b-22f similarly to what we have just described for the first bundle F1.

Figure 5:
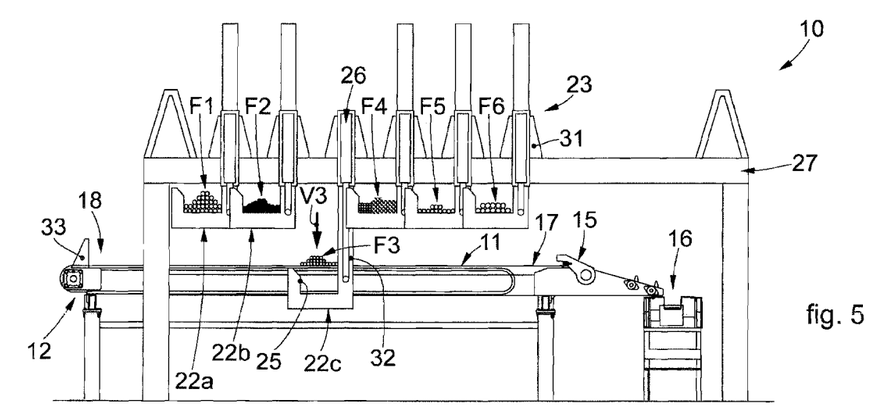

When a certain type of bars is required, for example those of the bundle F3, the containing unit 22c, see FIG. 5, is lowered, in the direction indicated by the arrow V3, between the interspaces 13 and positions the support seatings 25 under the work plane 11. In this condition the bars B are positioned resting on the support devices 12.

Figure 6:
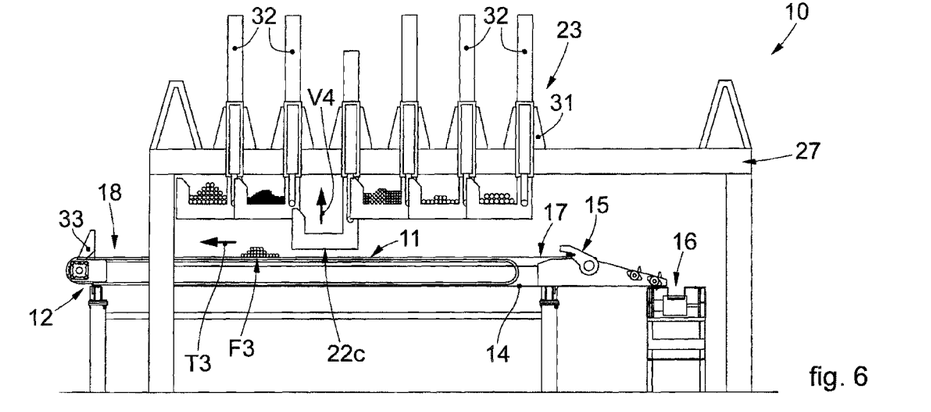

Then the movement devices 14 of the support devices 12 translate the bars in direction T3 to position them in a position not interfering with the movement of the containing unit 22c. The containing unit 22c is then lifted in direction V4 and taken into its second position, without bars B.

The bars B (FIG. 7) are suitably dispersed on the work plane 11 and are taken toward the discharge zone 17 by means of the movement devices 14, in the direction indicated by the arrow T4.

Figure 7:
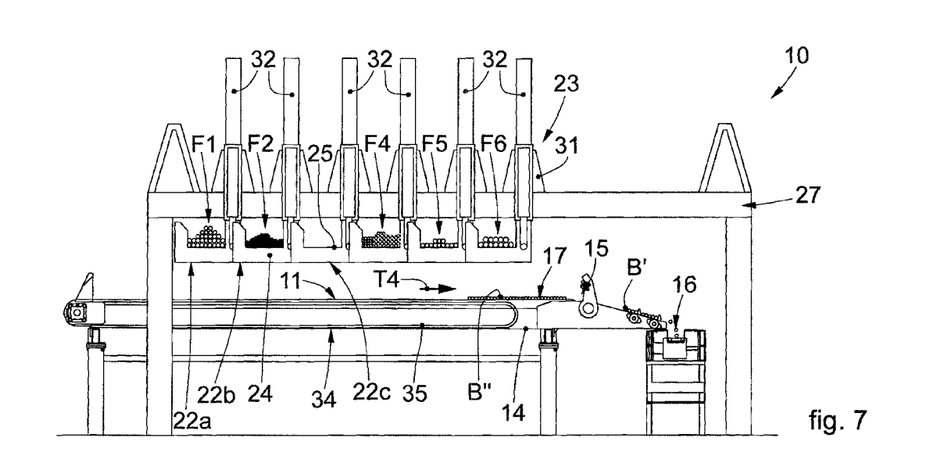

In this position, the removal device 15 removes at least one bar on each occasion to deliver it to the destination station 16.

A certain number of bars B' are therefore removed by the removal device 15, while the remaining bars B" are returned to the containing unit 22c.

Figure 8:
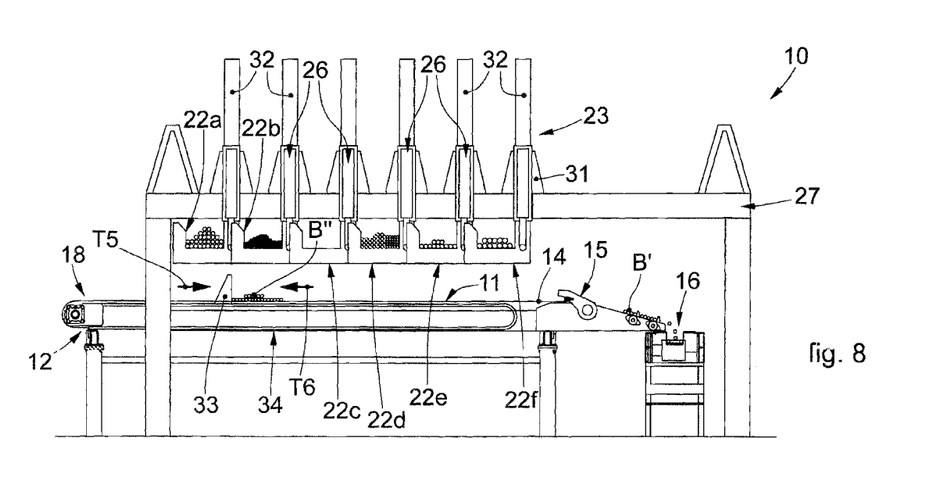

With reference to FIG. 8, the thruster 33 is translated in direction T5 by the corresponding movement device 34, so as to move to an appropriate position upstream of the containing unit 22c and such as to allow the accumulation of the bars B" without interfering with the descent of the containing unit 22c.

By means of the movement devices 14 of the work plane 11, the bars B" are translated in direction T6 to position themselves in abutment against the thruster 33 and therefore accumulate against it.

Figure 9:
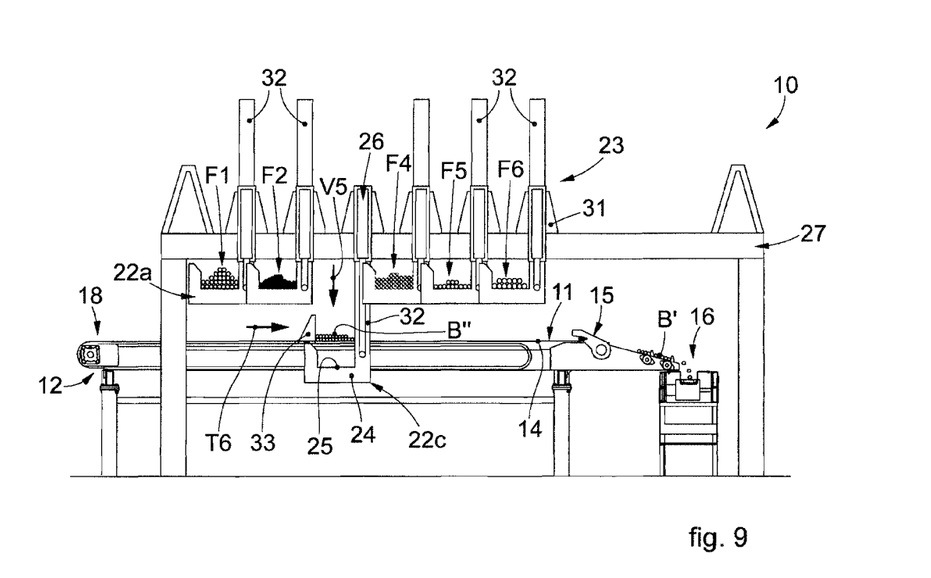

Once this accumulation step is complete, see FIG. 9, the containing unit 22c is lowered in direction V5 to dispose the support seatings 25 under the work plane 11.

With the thruster 33 and/or the movement devices 14 associated with the support devices 12, it is provided that the bars B" are positioned directly above the containing unit 22c, in the direction indicated by the arrow T6. The support rod 32 defines, in this case too, an abutment reference for the bars B" to allow them to be held.

Figure 10:
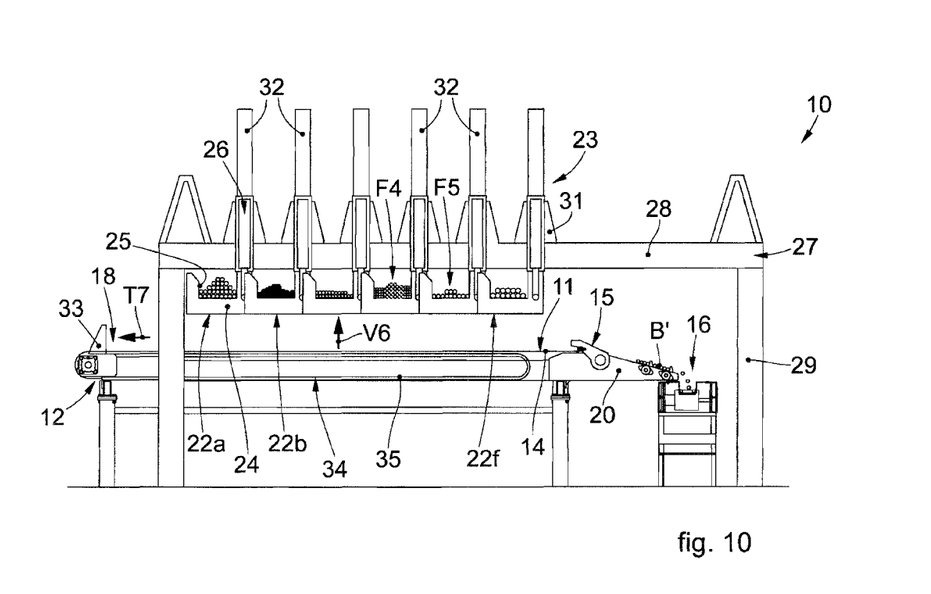

The thruster 33, see FIG. 10, at this point is translated in direction T7 until it returns to the inactive position in correspondence with the loading zone 18.

The containing unit 22c is instead lifted in the direction indicated by the arrow V6, to position itself in its second position.

With reference to FIGS. 11-16, a possible variant embodiment of the present invention is shown, in which the supply apparatus 10 comprises a plurality of containing units 122, in this case eight containing units 122, which can be moved into their first and second positions by rotation around pivoting elements 140.

In accordance with these embodiments of the invention, the containing units 122 can be pivoted to the support structure 27 with the pivoting elements 140.

The movement means 26, only one of which is shown in FIGS. 11-16, are configured to rotate the respective containing units 122 around the pivoting elements 140 to define at least the first and second positions.

The movement means 26 can comprise, for example, a rotary engine.

Also according to this embodiment, the containing units 122 comprise containing elements 24 defining support seatings 25 to contain bundles F of bars B.

The containing elements 24 comprise at least one pivoting segment 141 which is pivoted with the pivoting elements 140 to the support structure 27.

The pivoting segment 141 can define part of the support seating 25 of the bars B.

Moreover, during use, and as will be apparent hereafter, the pivoting segment 141 can define an abutment wall against which the bars B are positioned.

When the corresponding containing unit 122 is in its first position, the pivoting segment 141 is positioned incident to the work plane 11 and partly contained in the bulk of the latter, while the corresponding support seating 25 is positioned below the work plane 11.

In accordance with the embodiment shown in FIGS. 11-16, the supply apparatus 10 comprises a loading device 142, positioned in correspondence with the loading zone 18 and configured to load a plurality of bars B onto the work plane 11.

The loading device 142 can comprise a plurality of shaped arms 143 pivoted at one end and provided with an arched concavity suitable to receive the bars B for example from a roller way 145 and to load them onto the work plane 11.

According to some embodiments, the shaped arms 143 are installed rotating around a support shaft 144 installed in correspondence with the second lateral edge of the work plane 11.

With reference to FIGS. 11-16, we will now describe a possible functioning mode of the supply apparatus.

Figure 11:
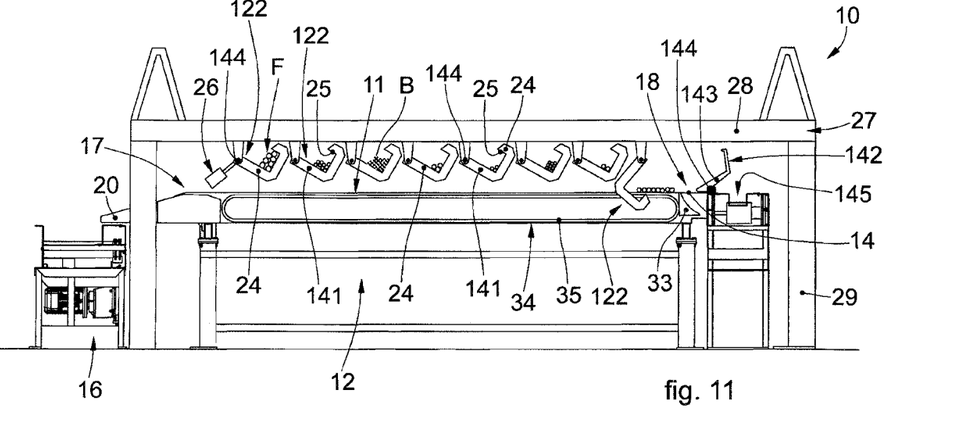
FIGS. 11 to 16 are lateral views of some operating steps of a discharge station of the present apparatus to supply bars.
Figure 12:
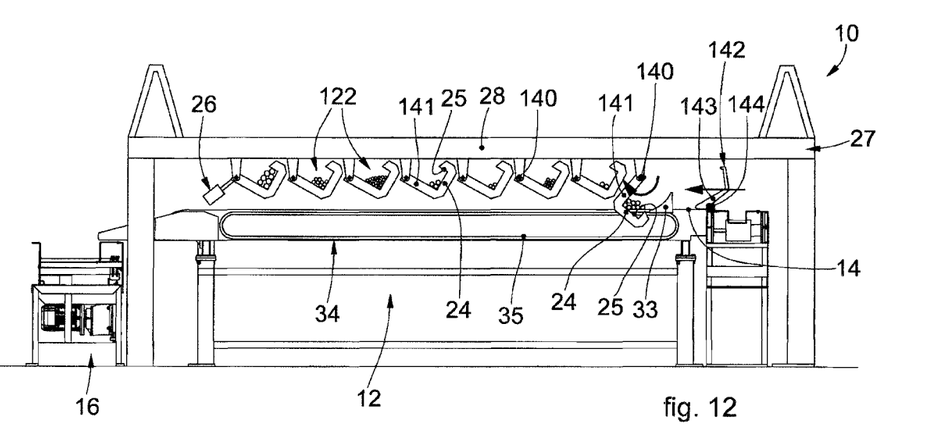
Figure 13:
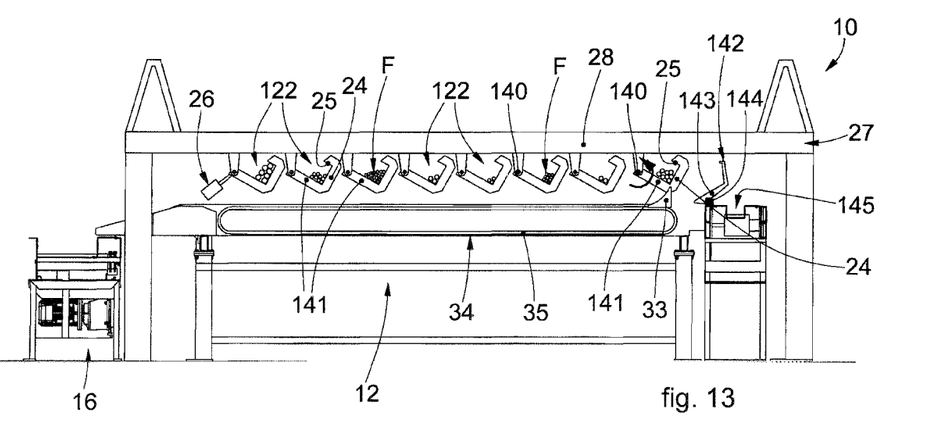

The loading device 142 positions its shaped arms 143 in correspondence with the roller way 145 until a certain quantity of bars is received.

Subsequently, the actuation of the loading device 142 is commanded which can provide to rotate the support shaft 144 so that the shaped arms 143 discharge the bars B onto the work plane 11 (FIG. 11).

In this condition one of the containing units 122 is taken into its first position, positioning its support seating 25 under the work plane 11. In this condition the pivoting segments 141 are positioned protruding from the work plane 11 and define abutment surfaces for the positioning of the bars B.

It is then provided to insert the bars B (FIG. 12) into the containing unit 122 which is positioned in the first position. This insertion can be determined by actuating the thruster 33, in a substantially similar manner to that described above, or by actuating the movement devices 14 associated with the support devices 12 of the work plane 11.

Subsequently (FIG. 13), the containing unit 122 is rotated around the pivoting elements 140 to move to its second position in which the bars B, and therefore the respective support seatings 25, are completely above the work plane 11 and in a position not interfering with the movements of the latter.

Figure 14:
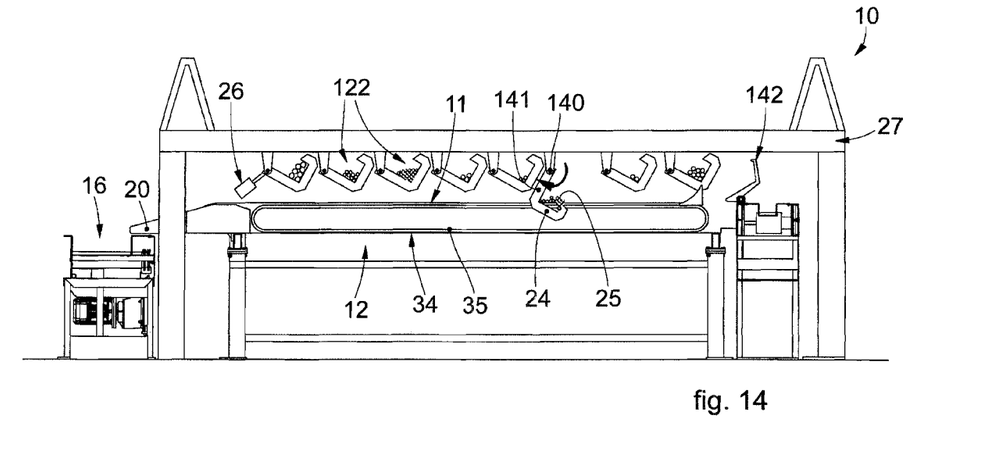
Figure 15:
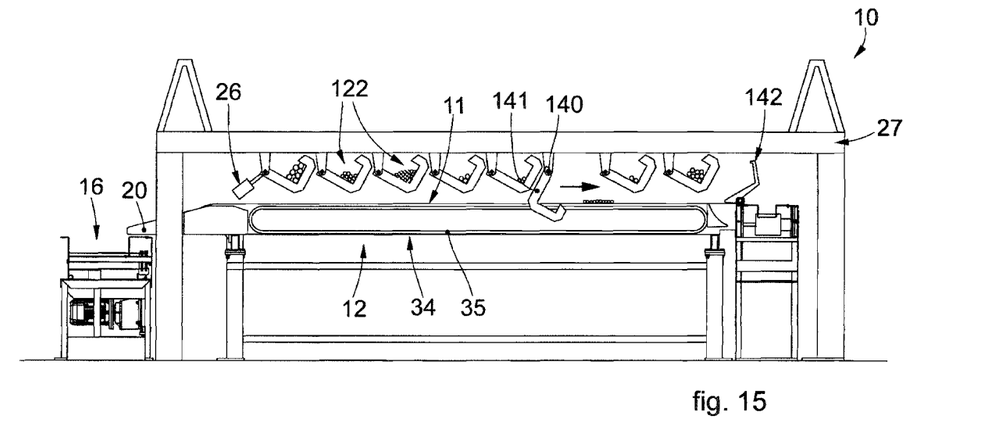
Figure 16:
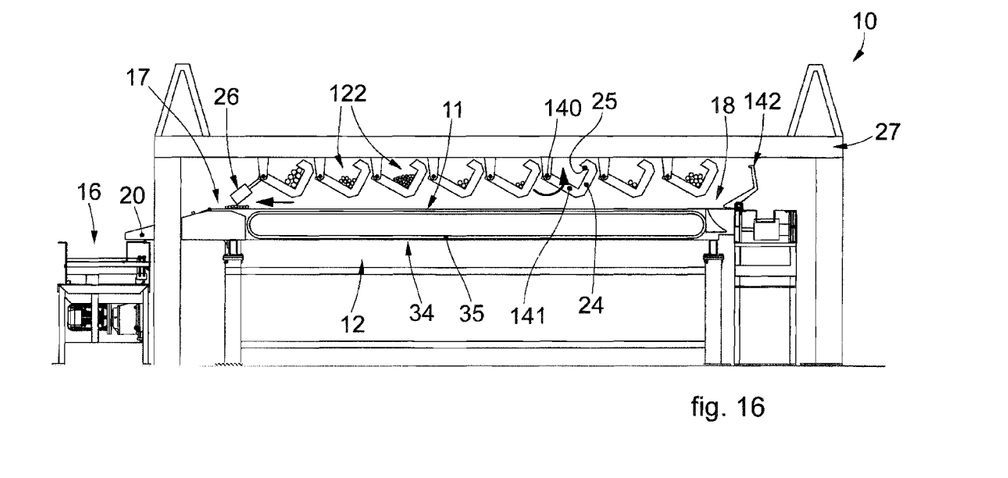

FIGS. 14-16 show a possible mode to supply the bars B of a bundle F to the user station 16.

Once the type of bars B to be supplied has been chosen, the actuation of the respective containing unit 122 is commanded to take it from its second position to its first position.

In particular, the actuation of the respective actuation means 126 is commanded.

In this condition, the containing elements 24 of the selected containing unit 122 are rotated around the pivoting axis to position the support seating 25 below the plane, or at least partly below the plane.

In this condition, the bundle of bars B is positioned resting on the work plane 11, and is no longer supported by the respective support seating 25.

It is then provided to move the movement devices 14 (FIG. 15) to move the bars B, which have just been rested on the work plane 11, into a position which does not interfere with the movement of the containing unit 122 which has delivered them.

In this condition, the holding unit 122 can be positioned again in its second position, in which the containing elements 24 are positioned above the work plane 11.

The bars B present on the work plane 11 (FIG. 16) can be moved, with the movement devices 14, toward the discharge zone 17 in which, for example with the removal device 21, (not shown in the drawings) the singularized removal of the bars B is carried out, to supply them downstream to the user station 16.

Embodiments of the present invention, described for example with reference to FIG. 1, can provide that two or more supply devices 10 cooperate one in series to another, for example as described below.

In particular, it can be provided that a first apparatus, substantially analogous to that described with reference to FIGS. 2-10, and shown on the left in FIG. 1, is provided to deliver its bars B to a first user station 16.

The user station 16 can comprise an operating machine 36 provided to perform operations on the bars B delivered by the supply apparatus 10.

By way of example only, the operating machine 36 can comprise shears to shear the bars B to size.

Downstream of the operating machine 36 the roller way 145 can be provided, or other similar means to discharge the bars B.

The roller way 145 can be configured to transfer the bars B sheared to size toward the user machines downstream. The user machines can include, by way of example only, stirrup-making machines, bending machines, welding machines or comparable and similar.

The roller way 145 is also positioned adjacent to the second supply apparatus 10, shown on the right in FIG. 1. In the case shown in FIG. 1, the second supply apparatus 10 can be substantially similar to what is described with reference to FIGS. 11-16.

By way of example only, it can be provided that the remaining segments of bars B of the cutting operation can be recovered and stored at least temporarily in the second supply apparatus 10 for possible subsequent use.

By way of example only, the loading device 142 is configured to remove the remaining bars B from the roller way 145 and load them onto the work plane 11 of the second supply apparatus 10.

The remaining B bars can be stored in respective containing units 122, from where they are subsequently removed, according to needs.

Subsequently, the second supply apparatus 10 is provided to remove the bars from the individual containing units 122 to deliver them, as described above, to the user station 16.

It is clear that modifications and/or additions of parts can be made to the apparatus and method to supply bars as described heretofore, without departing from the field and scope of the present invention.

It is also clear that, although the present invention has been described with reference to some specific examples, a person of skill in the art shall certainly be able to achieve many other equivalent forms of apparatus and method to supply bars, in particular metal bars, having the characteristics as set forth in the claims and hence all coming within the field of protection defined thereby.

In the following claims, the sole purpose of the references in brackets is to facilitate reading: they must not be considered as restrictive factors with regard to the field of protection claimed in the specific claims.

The invention claimed is:

1. Apparatus to supply bars (B) comprising a work plane (11) on which to position a bundle (F1-F6) of said bars (B) and a removal device (15) configured to remove at least one bar (B) from said work plane (11) in order to transfer it to a destination station (16), wherein it comprises a plurality of containing units (22a-22f; 122) positioned, at least during their condition of use, above said work plane (11) and each configured to house a respective bundle (F1-F6) of a determinate type of bar (B), and a plurality of movement means (26) each associated with a respective containing unit (22a-22f; 122) in order to take the latter into a first position in which one bundle (F1-F6) of said bars (B) is delivered to or removed from said work plane (11), and into at least a second position in which said containing unit (22a-22f; 122) is located completely above said work plane (11).

2. Apparatus as in claim 1, wherein said work plane (11) comprises a plurality of support devices (12) of the bars (B1-B6) between which there are interspaces (13) suitable to at least partly house said containing units (22a-22f; 122) when they are in their first position.

3. Apparatus as in claim 1, wherein said containing units (22a-22f; 122) are adjacent to each other in a transverse direction (T) to the extension in length of said work plane (11).

4. Apparatus as in claim 1, wherein each containing unit (22a-22f; 122) comprises a plurality of containing elements (24) aligned with each other in a longitudinal direction (L) and each defines a support seating (25) configured to support part of said bundle (F1-F6) of bars (B).

5. Apparatus as in claim 1, wherein said containing units (22a-22f) are supported by a support structure (27).

6. Apparatus as in claim 1, wherein said movement means (26) are configured to move the containing units (22a-22f) linearly, in a direction incident against said work plane (11).

7. Apparatus as in claim 6, wherein linear guide members (31) are associated with each containing unit (22a-22f), having guide axes oriented incident to the work plane (11), and provided to guide the movement of the containing unit (22a-22f) from the first to the second position and vice versa, and each containing element (24) is provided with a support rod (32) installed sliding in the guide members (31).

8. Apparatus as in claim 1, wherein said containing units (122) can be moved in their first position and second position by rotation around pivoting elements (140).

9. Method to supply bars that comprises positioning a bundle (F1-F6) of bars (B) on a work plane (11) and removing at least one bar (B) from said work plane (11) with a removal device (21) in order to transfer it to a destination station (16), wherein it provides to position respective bundles (F1-F6) of different types of bars (B) in a plurality of containing units (22a-22f; 122) and to keep, at least during a condition of use, said containing units (22a-22f; 122) above the work plane (11), wherein each containing unit (22a-22f; 122) is associated with respective movement means (26) to take said containing unit (22a-22f; 122) into a first position in which one bundle (F1-F6) of said bars (B) is delivered to or removed from said work plane (11) and into at least a second position in which said containing unit (22a-22f; 122) is located completely above said work plane (11).

10. Method to supply bars as in claim 9, wherein each containing unit (22a-22f; 122) is taken from its first to its second position by linear movement, or rotation around pivoting elements (140).

* * * * *